(12) United States Patent
Ramkumar et al.

(10) Patent No.: US 9,578,601 B2
(45) Date of Patent: Feb. 21, 2017

(54) METHODS AND APPARATUS FOR REDUCING MODEM POWER BASED ON A PRESENT STATE OF CHARGE OF BATTERY

(71) Applicant: QUALCOMM Incorporated, San Diego, CA (US)

(72) Inventors: Vasanth Kumar Ramkumar, San Diego, CA (US); Srinivasan Rajagopalan, San Diego, CA (US); Jeffrey A. Niemann, Superior, CO (US); Vijay Raman, Fort Collins, CO (US); Christopher Lee Medrano, Longmont, CO (US); Jon James Anderson, Boulder, CO (US); Amit Mahajan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/216,399

(22) Filed: Mar. 17, 2014

(65) Prior Publication Data

US 2015/0131461 A1 May 14, 2015

Related U.S. Application Data

(60) Provisional application No. 61/903,294, filed on Nov. 12, 2013.

(51) Int. Cl.
*H04W 24/00* (2009.01)
*H04W 52/02* (2009.01)
*G06F 1/32* (2006.01)

(52) U.S. Cl.
CPC ........ *H04W 52/0251* (2013.01); *G06F 1/3212* (2013.01); *G06F 1/3278* (2013.01);
(Continued)

(58) Field of Classification Search
CPC ..................... H04W 52/0251; H04W 52/0245; G06F 1/3278; G06F 1/3212
See application file for complete search history.

(56) References Cited

U.S. PATENT DOCUMENTS

| | | | |
|---|---|---|---|
| 6,594,475 B1 * | 7/2003 | Anvekar | H04B 7/0808 455/101 |
| 6,697,953 B1 | 2/2004 | Collins | |

(Continued)

OTHER PUBLICATIONS

ISA/EPO, International Search Report and Written Opinion of the International Searching Authority, Int'l. App. No. PCT/US2014/031061, Aug. 14, 2014, European Patent Office, Rijswijk, NL 11 pgs.

(Continued)

*Primary Examiner* — Jay P Patel
(74) *Attorney, Agent, or Firm* — Holland & Hart LLP

(57) ABSTRACT

Methods, systems, and devices are described for managing power of a user equipment (UE). A UE modem may determine the state of charge of the battery to determine that the battery is in one of two or more charge state levels, and may invoke one or more modem power saving modes based on the charge state level. Power saving modes may include, for example, reducing a number of available receive chains in a UE, initiating a time delay between one or more frequency scan requests performed by the UE, reducing a rate of neighbor search requests performed by the UE, providing a buffer status report (BSR) parameter that indicates a reduced amount of buffer data relative to an actual amount of buffer data for the UE, and/or adjusting a maximum transmit power level for an uplink channel.

26 Claims, 11 Drawing Sheets

(52) U.S. Cl.
CPC ... *H04W 52/0245* (2013.01); *H04W 52/0277* (2013.01); *Y02B 60/126* (2013.01); *Y02B 60/1292* (2013.01); *Y02B 60/50* (2013.01)

(56) References Cited

U.S. PATENT DOCUMENTS

| | | | |
|---|---|---|---|
| 7,245,666 B1* | 7/2007 | Gardner | H04L 1/005 375/262 |
| 7,270,931 B2 | 9/2007 | Angelopoulos et al. | |
| 7,912,517 B2 | 3/2011 | Park | |
| 8,155,711 B2 | 4/2012 | Deshpande et al. | |
| 8,270,931 B1* | 9/2012 | Shetty | H04W 36/0094 455/343.1 |
| 2004/0153676 A1* | 8/2004 | Krantz et al. | 713/300 |
| 2007/0178839 A1* | 8/2007 | Rezvani et al. | 455/62 |
| 2008/0146154 A1* | 6/2008 | Claussen et al. | 455/63.1 |
| 2008/0187030 A1* | 8/2008 | Khan | 375/219 |
| 2008/0219328 A1* | 9/2008 | Sanada et al. | 375/148 |
| 2009/0197549 A1* | 8/2009 | Ben-Ayun | H04B 7/0811 455/140 |
| 2009/0316801 A1* | 12/2009 | Nitta | H04B 7/0413 375/260 |
| 2010/0234060 A1* | 9/2010 | Beamish | H04W 52/028 455/522 |
| 2011/0006739 A1 | 1/2011 | Chishima et al. | |
| 2011/0038271 A1* | 2/2011 | Shin et al. | 370/252 |
| 2011/0179330 A1* | 7/2011 | Matsumoto | 714/748 |
| 2011/0212724 A1* | 9/2011 | Wirtanen et al. | 455/435.2 |
| 2011/0294456 A1* | 12/2011 | Anderson | H04W 28/18 455/404.1 |
| 2012/0295650 A1* | 11/2012 | Futaki et al. | 455/507 |
| 2013/0005272 A1* | 1/2013 | Shah | H04B 1/70754 455/67.11 |
| 2013/0196659 A1* | 8/2013 | Damji et al. | 455/434 |
| 2013/0242826 A1 | 9/2013 | Black et al. | |
| 2013/0267224 A1 | 10/2013 | Krishnaswamy et al. | |
| 2013/0310117 A1* | 11/2013 | Ohira et al. | 455/573 |
| 2014/0269994 A1* | 9/2014 | HomChaudhuri | H04W 52/0209 375/316 |
| 2014/0307819 A1* | 10/2014 | Paulraj | H04W 28/0215 375/267 |
| 2015/0124710 A1* | 5/2015 | Sun | H03G 3/3068 370/329 |

OTHER PUBLICATIONS

Naik, kshirasagar, "A Survey of Software Based Energy Saving Methodologies for Handheld Wireless Communication Devices", Tech. Report No. 2010-13, Department of ECE, University of Waterloo; 46 pages.
Introduction to GSM/GPRS Wireless Modems.
IPEA/EPO, Second Written Opinion of the International Preliminary Examining Authority, Int'l. App. No. PCT/US2014/031061, Oct. 27, 2014, European Patent Office, Rijswijk, NL 7 pgs.
Halperin et al., "Demystifying 802.11n Power Consumption," HotPower '10 Proceedings of the 2010 International Conference on Power Aware Computing and Systems, 2010, 5 pgs., Article No. 1, USENIX Association Berkeley, CA, USA.

* cited by examiner

METHODS AND APPARATUS FOR REDUCING MODEM POWER BASED ON A PRESENT STATE OF CHARGE OF BATTERY

CROSS REFERENCE TO RELATED APPLICATIONS

The present application for Patent claims priority to U.S. Provisional Patent Application No. 61/903,294 by Ramkumar et al., entitled "Methods and Apparatus for Reducing Modem Power Based on a Present State of Charge of Battery," filed Nov. 12, 2013, assigned to the assignee hereof, and expressly incorporated by reference herein.

BACKGROUND

Field

Certain aspects of the present disclosure generally relate to methods and apparatuses for reducing battery power of user equipment (UE) in a wireless communication system, and more particularly to methods and apparatuses for adjusting one or more modem control parameters of a modem of the UE based on a state of charge of the UE battery.

Background

Wireless communications networks are widely deployed to provide various types of communication content such as voice, video, packet data, messaging, broadcast, and the like. These networks may be multiple-access networks capable of supporting communication with multiple users by sharing the available network resources. In wireless communications networks, various pieces of UEs are often portable and rely on one or more batteries to provide power to the device. These UEs commonly have one or more transmitters/receivers capable of communicating using one or more radio access technologies. Included in the transmitter/receiver hardware is a modem that controls radio transmissions transmitted from and received at a UE.

UEs commonly are operated using an internal power source, such as one or more batteries, to allow for convenient portability of the device. As is well known, the power source in such cases may require replacement or recharging when the power source has a low or no remaining stored charge. In the event that the charge of the power source is completely depleted, the UE may not be operated to perform any communications functions until the power source is replaced, the power source is recharged, or the UE is plugged in to line power. Such inoperability of the UE may have detrimental effects to a user, who may rely on the UE to perform one or more potentially important tasks, such as transmission/reception of a data message, and/or transmission/reception of a voice call. Thus, it may be beneficial to adjust UE operation based on actual power source charge state to enhance power source lifetime of a UE.

SUMMARY

The described features generally relate to one or more improved systems, methods, and/or apparatuses for managing battery power of a UE. According to certain examples, a power management circuit may be configured to probe a state of charge of a battery of the UE. A UE modem may poll the power management circuit and determine the state of charge of the battery. By periodically probing or otherwise determining the current state of charge of the battery, the modem can determine that the battery is in one of two or more charge state levels, and may, responsive to the determining, invoke a modem power saving mode based on the charge state level. According to some examples, a modem may invoke one or more power saving modes, which may include, for example, reducing a number of available receive chains in a UE, initiating a time delay between one or more frequency scan requests performed by the UE, reducing a rate of neighbor search requests performed by the UE, providing a buffer status report (BSR) parameter that indicates a reduced amount of buffer data relative to an actual amount of buffer data for the UE, and/or adjusting a maximum transmit power level for an uplink channel.

According to aspects of the disclosure, a method for managing power of a user equipment (UE) in a wireless communications network is provided. The method generally includes determining a present state of charge of an internal power source of the UE, and adjusting, responsive to the determining, one or more modem control parameters of a modem of the UE, the adjusting including a reduction in a number of receive chains of the UE available for use by the modem. In some examples, the determining may include identifying a charge state level of the internal power source from a plurality of charge state levels responsive to the determining, and the adjusting may include selecting a power saving mode for the modem based on the identified charge state level. In certain examples, the reduction in the number of available receive chains of the UE may include advertising a rank of the UE that is less than a maximum rank of the UE.

In certain examples, the adjusting one or more modem control parameters may also include reducing a rate of neighbor search requests performed by the UE such as by, for example, determining a reference signal received power (RSRP), where the rate of neighbor search requests is based on the RSRP. In some examples, the neighbor search requests may include one or more of inter-frequency or inter-radio access technology measurements. In some examples, the adjusting one or more modem control parameters further may include providing a buffer status report (BSR) parameter that indicates a reduced amount of data value relative to an actual amount of data value for the UE. Additionally or alternatively, the adjusting one or more modem control parameters may include adjusting a maximum transmit power level for an uplink channel, and/or increasing a time delay between one or more frequency scan requests performed by the UE. In certain examples, the time delay may be increased based on a number of consecutive unsuccessful frequency scan requests.

According to another aspect of the disclosure, an apparatus for managing power of a user equipment (UE) in a wireless communications network is provided. The apparatus generally includes at least one processor configured to determine a present state of charge of an internal power source of the UE, and adjust, responsive to the determining, one or more modem control parameters of a modem of the UE to reduce a number of receive chains of the UE available for use by the modem. In certain examples, the at least one processor may be further configured to identify a charge state level of the internal power source from a plurality of charge state levels responsive to the determining, and select a power saving mode for the modem based on the identified charge state level. In other examples, the at least one processor may be further configured to advertise a rank of the UE that is less than a maximum rank of the UE.

In certain examples, the at least one processor may be further configured to reduce a rate of neighbor search requests performed by the UE. The at least one processor may be configured to, for example, determine a reference signal received power (RSRP), and the rate of neighbor search requests may be based on the RSRP. In some examples, the neighbor search requests may include one or more of inter-frequency or inter-radio access technology measurements. Additionally or alternatively, the at least one processor may be further configured to provide a buffer status report (BSR) parameter that indicates a reduced amount of data value relative to an actual amount of data value for the UE. In some examples, the at least one processor may be further configured to adjust a maximum transmit power level for an uplink channel, and/or increase a time delay between one or more frequency scan requests performed by the UE. The time delay may be increased, for example, based on a number of consecutive unsuccessful frequency scan requests.

According to another aspect, an apparatus for managing power of a user equipment (UE) in a wireless communications network is provided. The apparatus generally includes means for determining a present state of charge of an internal power source of the UE, and means for adjusting, responsive to the determining, one or more modem control parameters of a modem of the UE to reduce a number of receive chains of the UE available for use by the modem. In certain examples, the means for determining may include means for identifying a charge state level of the internal power source from a plurality of charge state levels responsive to the determining, and the means for adjusting may include means for selecting a power saving mode for the modem based on the identified charge state level.

In some examples, the means for adjusting may include means for advertising a rank of the UE that is less than a maximum rank of the UE, and/or means for reducing a rate of neighbor search requests performed by the UE. Additionally or alternatively, the means for adjusting one or more modem control parameters may include means for providing a buffer status report (BSR) parameter that indicates a reduced amount of data value relative to an actual amount of data value for the UE, and/or the means for adjusting one or more modem control parameters may include means for increasing a time delay between one or more frequency scan requests performed by the UE.

In another aspect, a computer program product for managing power of a user equipment (UE) in a wireless communications network is provided. The computer program product generally includes a non-transitory computer-readable medium storing instructions executable by a processor. The instructions may be executable by the processor to determine a present state of charge of an internal power source of the UE, and adjust, responsive to the determining, one or more modem control parameters of a modem of the UE to reduce a number of receive chains of the UE available for use by the modem. In certain examples, the instructions may be further executable by the processor to identify a charge state level of the internal power source from a plurality of charge state levels responsive to the determining, and select a power saving mode for the modem based on the identified charge state level.

In certain examples, the reduction in the number of available receive chains of the UE may include advertising a rank of the UE that is less than a maximum rank of the UE. In some examples, the instructions may be further executable by the processor to reduce a rate of neighbor search requests performed by the UE. Additionally or alternatively, the instructions may be further executable by the processor to provide a buffer status report (BSR) parameter that indicates a reduced amount of data value relative to an actual amount of data value for the UE, and/or the instructions may be further executable by the processor to increase a time delay between one or more frequency scan requests performed by the UE.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
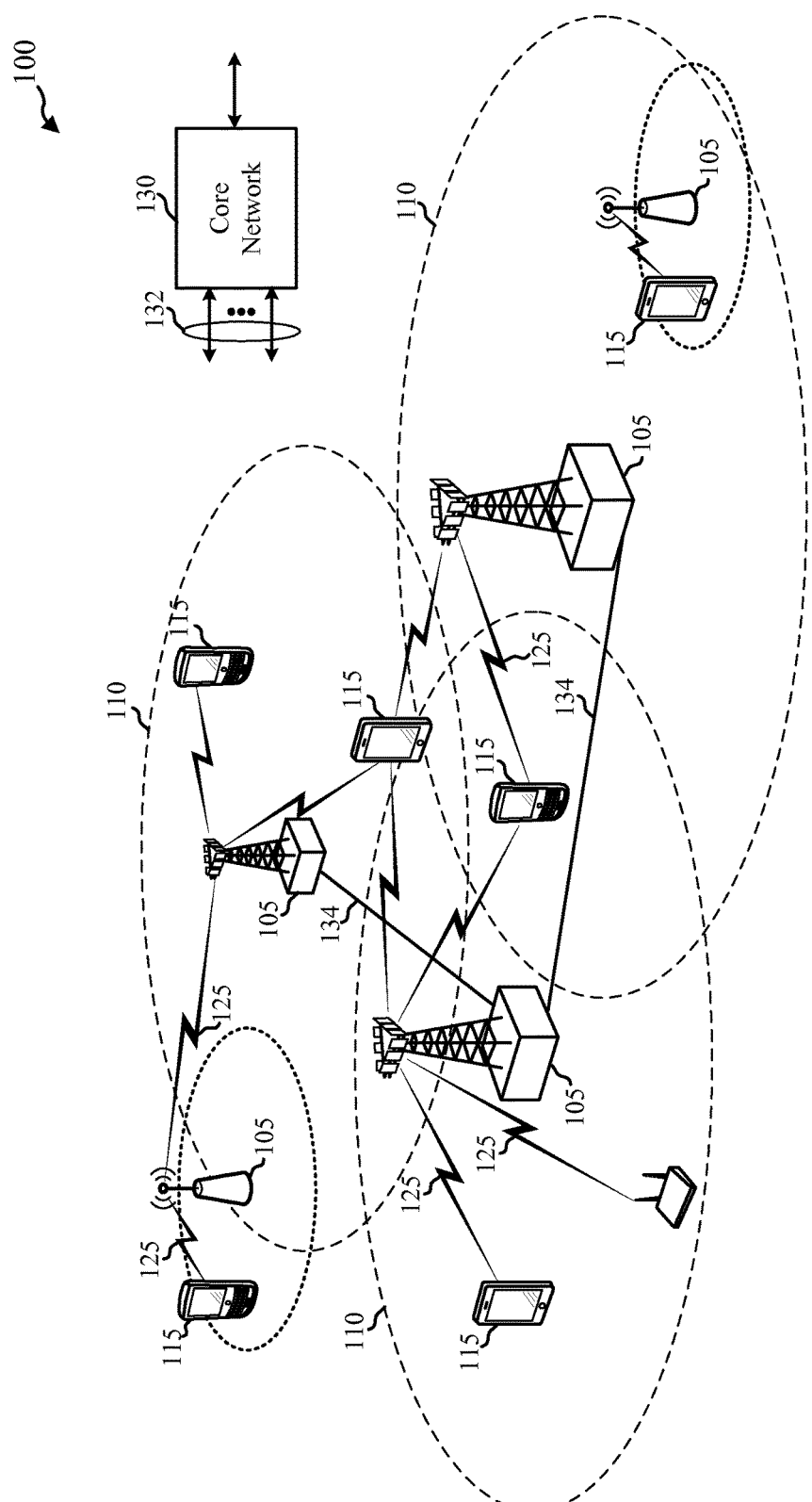
FIG. 1 is a diagram illustrating an example of a wireless communications system in accordance with various aspects of the disclosure.

Described aspects are directed to systems and methods for managing a power source of a UE based on the present state of charge of the power source. According to examples, a power management circuit may be configured to probe a state of charge of a battery of the UE. A UE modem may poll the power management circuit or otherwise determine the state of charge of the battery. By periodically probing the current state of charge of the battery, the modem may determine that the battery is in one of two or more charge state levels, and may, responsive to the determination, invoke a modem power saving mode based on the charge state level.

According to some examples, certain modem features may be implemented based on charge state to help in enhancing useful lifetime of a power source, such as a battery of a UE. For example, receive circuitry may be powered down during discontinuous reception (DRX) operations, which can save power relative to such receive circuitry being constantly powered. Additionally, transmit and/or receive circuitry may be placed in idle mode or placed online/offline based on one or more criteria, such as the presence of buffered data in a transmit queue, for example.

In some examples, one or more of a combination of different power saving modes may be invoked based on battery charge state of the UE. The power saving modes of the modem may include reducing a number of available receive chains in a UE, initiating a time delay between one or more frequency scan requests performed by the UE, reducing a rate of neighbor search requests performed by the UE, providing a buffer status report (BSR) parameter that indicates a reduced amount of buffer data relative to an actual amount of buffer data for the UE, and/or adjusting a maximum transmit power level for an uplink channel.

Techniques described herein may be used for various wireless communications systems such as cellular wireless systems, Peer-to-Peer wireless communications, wireless local access networks (WLANs), ad hoc networks, satellite communications systems, and other systems. The terms "system" and "network" are often used interchangeably. These wireless communications systems may employ a variety of radio communication technologies such as Code Division Multiple Access (CDMA), Time Division Multiple Access (TDMA), Frequency Division Multiple Access (FDMA), Orthogonal FDMA (OFDMA), Single-Carrier FDMA (SC-FDMA), and/or other radio technologies. Generally, wireless communications are conducted according to a standardized implementation of one or more radio communication technologies called a Radio Access Technology (RAT). A wireless communications system or network that implements a Radio Access Technology may be called a Radio Access Network (RAN).

Examples of Radio Access Technologies employing CDMA techniques include CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. Examples of TDMA systems include various implementations of Global System for Mobile Communications (GSM). Examples of Radio Access Technologies employing OFDM and/or OFDMA include Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Referring first to FIG. 1, a diagram illustrates an example of a wireless communications system 100. The system 100 includes base stations (or cells) 105, communication devices 115, and a core network 130. The base stations 105 may communicate with the communication devices 115 under the control of a base station controller (not shown), which may be part of the core network 130 or the base stations 105 in various examples. Base stations 105 may communicate control information and/or user data with the core network 130 through backhaul links 132. The base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some examples, base stations 105 may be referred to as a base transceiver station, a radio base station, an access point, a radio transceiver, a NodeB, eNodeB (eNB), Home NodeB, a Home eNodeB, or some other suitable terminology. The coverage area 110 for a base station may be divided into sectors making up only a portion of the coverage area (not shown). The system 100 may include base stations 105 of different types (e.g., macro, micro, and/or pico base stations). There may be overlapping coverage areas for different technologies.

The devices 115 may be, for example, battery operated devices. According to certain examples, the devices 115 may be configured to probe a state of charge of a battery of the device 115. By periodically probing the current state of charge of the battery, a device 115 may determine that the battery is in one of two or more charge state levels, and may invoke a power saving mode based on the charge state level.

Where the system 100 includes areas of overlapping coverage or where the system 100 supports multiple signal frequencies, the devices 115 may periodically perform a scan of the available frequencies to determine the suitability of a particular frequency for wireless communication. Such a scan may be referred to as a frequency scan (FSCAN) request, and may be performed periodically by a device 115 in order to detect a frequency for wireless communication that is suitable for the device 115. In addition to FSCAN requests, a device 115 may also monitor signals from one or more neighboring base stations 105 through performance of periodic neighbor search requests, and information from such neighbor search requests may be used for handover of a device 115 between different base stations 105.

In some examples, the system 100 includes an LTE/LTE-A network. In LTE/LTE-A networks, the terms evolved Node B (eNB) and user equipment (UE) may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) and/or via backhaul links 132 (e.g., through core network 130). The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The UEs 115 are dispersed throughout the wireless network 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

Figure 2:
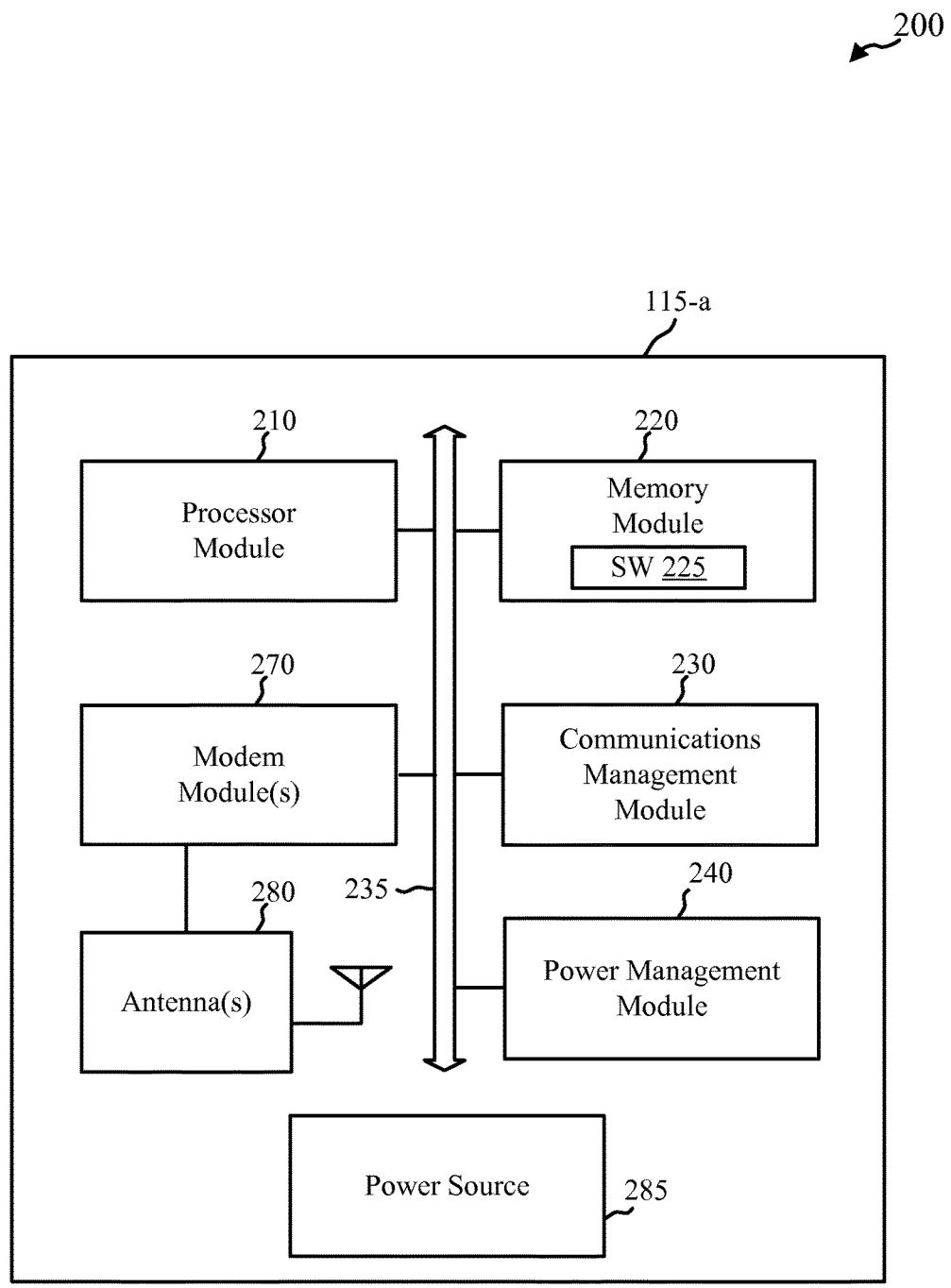
FIG. 2 shows a block diagram of an example of a user equipment in accordance with various aspects of the disclosure.

With reference now to FIG. 2, an example wireless communication system 200 that manages power of a UE is depicted. System 200 includes a UE 115-a, which may be an example of a user equipment 115 of FIG. 1. UE 115-a may include a processor module 210, a memory module 220, a communications management module 230, a power management module 240, one or more modem module(s) 270, and one or more antenna(s) 280, which each may be in communication, directly or indirectly, with each other (e.g., over one or more buses 235). The UE 115-a also includes an internal power source 285 that may provide operating power to the components of the UE 115-a. In some examples, the UE is configured to determine the present state of charge of the internal power source 285. In some examples, the power management module 240 may be configured to probe the state of charge of an internal power source 285. The power management module 240 may include a power management integrated circuit (PMIC), for example. In some examples, the internal power source 285 includes one or more batteries along with associated charge control circuitry. As used herein the terms internal power source and battery may be used interchangeably.

The processor module 210 may include an intelligent hardware device, e.g., a central processing unit (CPU), a microcontroller, an application specific integrated circuit (ASIC), etc. The memory module 220 may include random access memory (RAM) and read-only memory (ROM). The memory module 220 may store computer-readable, computer-executable software code 225 containing instructions that are configured to, when executed (or when compiled and executed), cause the processor module 210 to perform various functions described herein. The components of UE 115-a may, individually or collectively, be implemented with one or more ASICs adapted to perform some or all of the applicable functions in hardware. Each of the noted modules may be means for performing one or more functions related to operation of the UE 115-a.

In certain examples, the modem module(s) 270 may be configured to perform various functions associated with the air interface between the UE 115-a and one or more base stations, such as base stations 105 of FIG. 1, for example. Such functions may include, for example, modulation and demodulation of signals, and various encoding and communications functions required for communications with a base station. In some examples, the modem module(s) 270 may determine the present state of charge of power source 285, and may adjust one or more modem control parameters of the modem based on the determined state of charge. For example, adjusting the one or more modem control parameters of the modem includes reducing a number of receive chains of the UE available for use by the modem. In some examples, adjusting the one or more modem control parameters may include invoking one or more power saving modes of operation based on the present state of charge. The modem module(s) 270 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285.

In some examples, the current state of charge of the power source 285 may be classified into one or more charge state levels. The charge state levels may correspond to a remaining level of available power of the power source 285, and may include, for example, one or more warning states based on an amount of remaining charge. For example, a first level of remaining power of the power source 285 may correspond to a first charge state level, and a second level of remaining power, less than the first level of power, may correspond to a second charge state level. Furthermore, the charge state level may depend upon whether the power source 285 is connected to an external power source. Thus, if power source 285 has a relatively low charge state level but is connected to an external power source, the power management module 240 and/or modem module(s) 270 may disregard the low charge state level because the power source 285 is being recharged and current power consumption requirements may be met by the external power source.

As mentioned above, different charge state levels may be defined, and a first charge state level may correspond to a fully charged internal power source 285, and one or more other charge state levels may corresponding to the power source having some threshold percentage or ratio of remaining charge. In some examples, there are two charge state levels, such as above 10% and at or below 10%. In other examples, there are three charge state levels. However, any number of charge state levels may be used. In some examples, the power management module 240 may identify the charge state level based on the present state of charge of the power source 285. In other examples, the modem module(s) 270 may identify the charge state level based on the present state of charge of the power source 285.

As mentioned above, in some examples the UE 115-*a* may include one or more power saving modes. The one or more power saving modes may control various functions of UE 115-*a* and/or the various modules and processors contained within UE 115-*a*. In certain examples, the power saving modes are controlled by or associated with one or more algorithms. The one or more power savings modes may be controlled by any of the processor module 210, the one or more modem module(s) 270, the communications management module 230 and/or the power management module 240. In some examples, the identified charge state level may invoke one or more power saving modes. For example, as discussed above, the current state of charge of the power source 285 may be determined, and one or more modem control parameters of modem module(s) 270 may be adjusted based on the current state of charge of the power source 285. In examples that may include more than two charge states, the adjusting of the one or more control parameters of the modem module(s) 270 may include selecting one or more power saving modes based on the identified charge state level.

For example, each antenna 280 of UE 115-*a* may include one or more receive chains. Multiple receive chains may allow UE 115-*a* to receive and process multiple signals simultaneously. However, the number of available receive chains may have an effect on the power consumption of a UE 115-*a*. As mentioned above, based on the current state of charge of power source 285, the UE 115-*a* may selectively activate or deactivate one or more receive chains, and thereby change the power requirements of the UE 115-*a*, by adjusting one or more modem control parameters of the UE 115-*a*. The activation or deactivation may be initiated by one or more of the modem module(s) 270, the processor module 210, the communications management module 230 or the power management module 240. Therefore, the number of active or available receive chains may be less than the actual or maximum number of receive chains included in the UE 115-*a*.

The number of available receive chains may be changed through, for example, advertising the rank of the UE based on the charge state of power source 285. For example, an advertised rank of "1" may correspond to a UE 115-*a* with only one available receive chain. The advertised rank is at its maximum when all of the receive chains included in a UE 115-*a* are active or available. Therefore, in some examples, the number of available receive chains may be reduced by advertising a rank of the UE 115-*a* that is less than a maximum rank of the UE 115-*a* (e.g., based on the charge state of power source 285). Similarly, if carrier aggregation is enabled, a UE 115-*a* may monitor multiple receive chains on more than one downlink (DL) carrier (frequency), which would allow an increase in data throughput. In such instances, based on the present state of charge of an internal power source 285, the UE 115-*a* may advertise a channel quality indicator (CQI) as zero, which may cause the network to deactivate one or more of the secondary carriers.

Additionally or alternatively, power consumption may be adjusted through one or more changes to the FSCAN requests of a UE. As discussed above, UE 115-*a* may periodically perform frequency scan (FSCAN) requests to search for signals and/or base stations suitable for wireless communication. In certain instances, such as when channel conditions are poor, frequent FSCAN requests may consume a significant amount of battery power. In some examples, to manage the power of a UE 115-*a*, a time delay between one or more FSCAN requests may be increased. The time delay may be increased by adjusting one or more modem control parameters of a modem of the UE 115-*a* based on the present state of charge of the power source 285. Any one of the processor module 210, the modem module(s) 270, the communications management module 230 and/or the power management module 240 may control the time delay between FSCAN requests. In some examples, the time delay is increased based on a number of consecutive unsuccessful FSCAN requests. For example, following consecutive unsuccessful FSCAN requests, a delay may be implemented before initiating another FSCAN request, and the delay may be further increased based on one or more of the power source 285 charge state or additional consecutive unsuccessful FSCAN requests.

Additionally or alternatively, power consumption for a UE 115-*a* in a Radio Resource Control (RRC) connected state may be reduced and/or adjusted by advertising a category of the UE 115-*a* that is lower than the actual category of the UE 115-*a* and/or that is lower than the highest category for which the UE 115-*a* is capable of advertising. For example, a Cat 4 UE 115-*a* may advertise its category as Cat 3 or a Cat 3 UE 115-*a* may advertised its category as Cat 2 based on the present state of charge of an internal power source 285.

As mentioned above, UE 115-*a* may periodically perform a neighbor search to identify channel conditions of one or more neighboring base stations. As part of the neighbor search requests, a UE 115-*a* may also make one or more measurements. In some examples, the one or more measurements may include one or more inter-frequency or inter-radio access technology measurements. In other examples, the UE 115-*a* may determine a reference signal received power (RSRP) of the serving base station and one or more neighboring base stations. In aspects, the rate at which these neighbor search requests are performed may be controlled by any of the processor module 210, the modem module(s) 270, the communications management module 230 and/or the power management module 240. In certain examples, the rate of neighborhood search requests performed by the UE is reduced by adjusting one or more modem control parameters of a modem of UE 115-*a*. The rate of neighbor search requests may be reduced based on the current state of charge of power source 285. In some examples, the rate at which neighbor search requests are performed by the UE 115-*a* may be based on the one or more inter-frequency or inter-radio access technology measurements. Furthermore, the rate of neighborhood search requests may be based on the RSRP in some examples. For example, if the power source has a low charge state, and the RSRP of the serving base station is relatively strong, it may be unlikely that the UE 115-*a* will need to be handed over to a neighbor base station, and a time period between consecutive neighbor search requests may be increased to extend the life of power source 285.

The UE 115-*a* may, in further examples, provide a buffer status report (BSR) parameter, which indicates whether the UE 115-*a* has any data to transmit on an uplink and/or how much data to be transmitted. In some examples, a BSR may be provided that indicates a reduced amount of data relative to an actual amount of data for the UE. In some examples, the BSR may be provided by adjusting one or more modem control parameters of a modem of a UE 115-*a* based on the current state of charge of an internal power source of the UE 115-*a*. To conserve battery power, UE 115-*a* may advertise a reduced, or zero, BSR value. Such an action will result in reduced or no uplink resource grants provided to the UE 115-*a*, and thereby extend the life of the power source 285. In still further examples, UE 115-*a* may adjust a maximum transmit power level for an uplink channel based on the current state of charge of power source 285.

Figure 3:
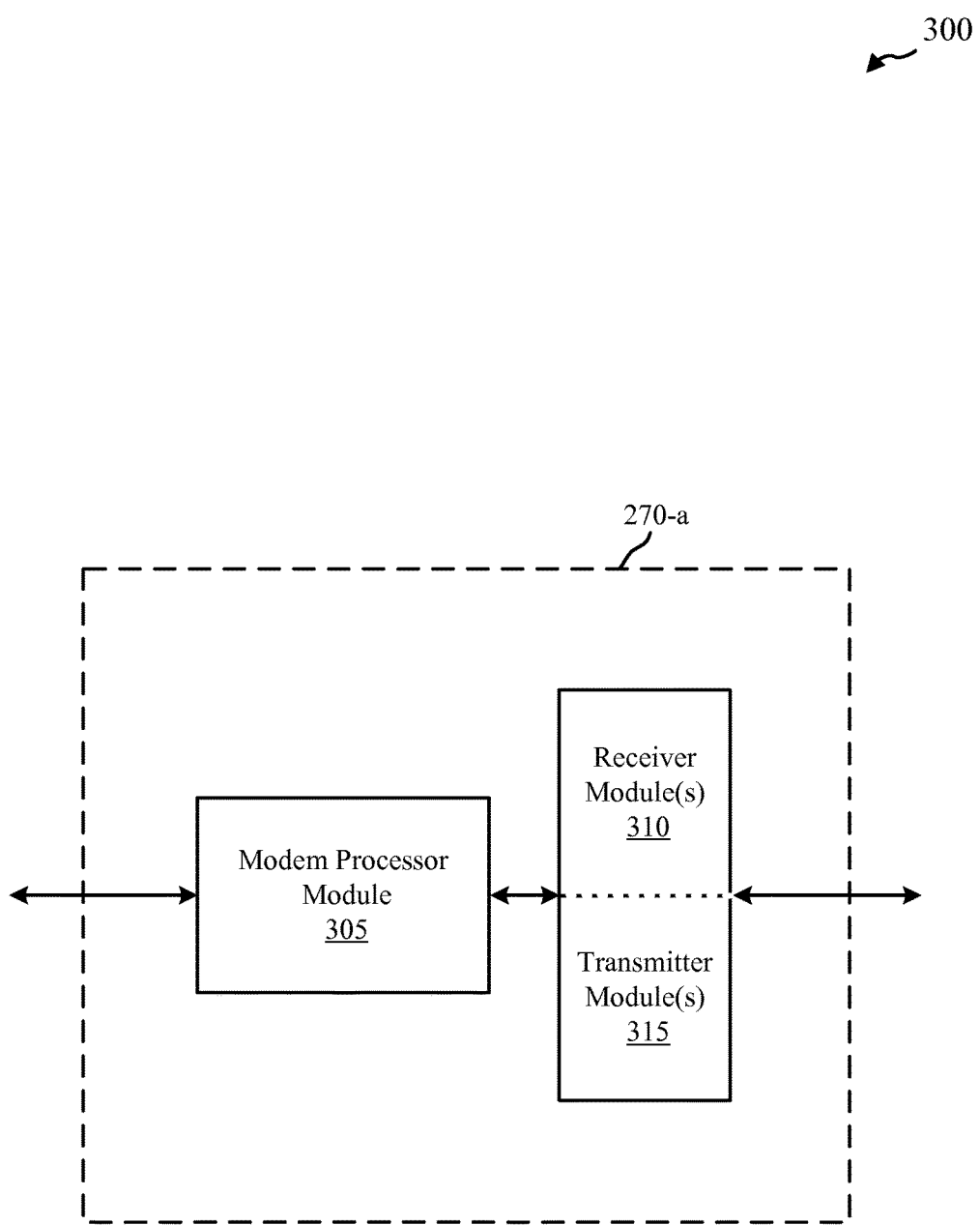
FIG. 3 shows a block diagram of an example of a modem module in accordance with various aspects of the disclosure.

FIG. 3 illustrates an example of a device 270-*a*, which may be an example of one or more modem module(s) 270 of FIG. 2. In some examples, the device 270-*a* may be an example of one or more aspects of UE 115 described with reference to FIG. 1 and/or FIG. 2. Device 270-*a* includes a modem processor module 305, one or more receiver module(s) 310 and one or more transmitter module(s) 315. Each of these components may be in communication with each other either directly or indirectly.

The components of the device 270-*a* may, individually or collectively, be implemented with one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

The transmitter module(s) 315 may transmit to base stations, such as base station 105 of FIG. 1, to establish communications with one or more wireless communications networks (e.g., E-UTRAN, UTRAN, etc.), as described above. The receiver module(s) 310 may receive downlink transmission from base stations, such as base station 105 of FIG. 1, as described above. In some examples, the modem processor module 305 may determine a present charge state of a UE power source and, based on the present charge state, invoke one or more power saving techniques, such as described above with respect to FIG. 1 and/or FIG. 2, for example.

Figure 4:
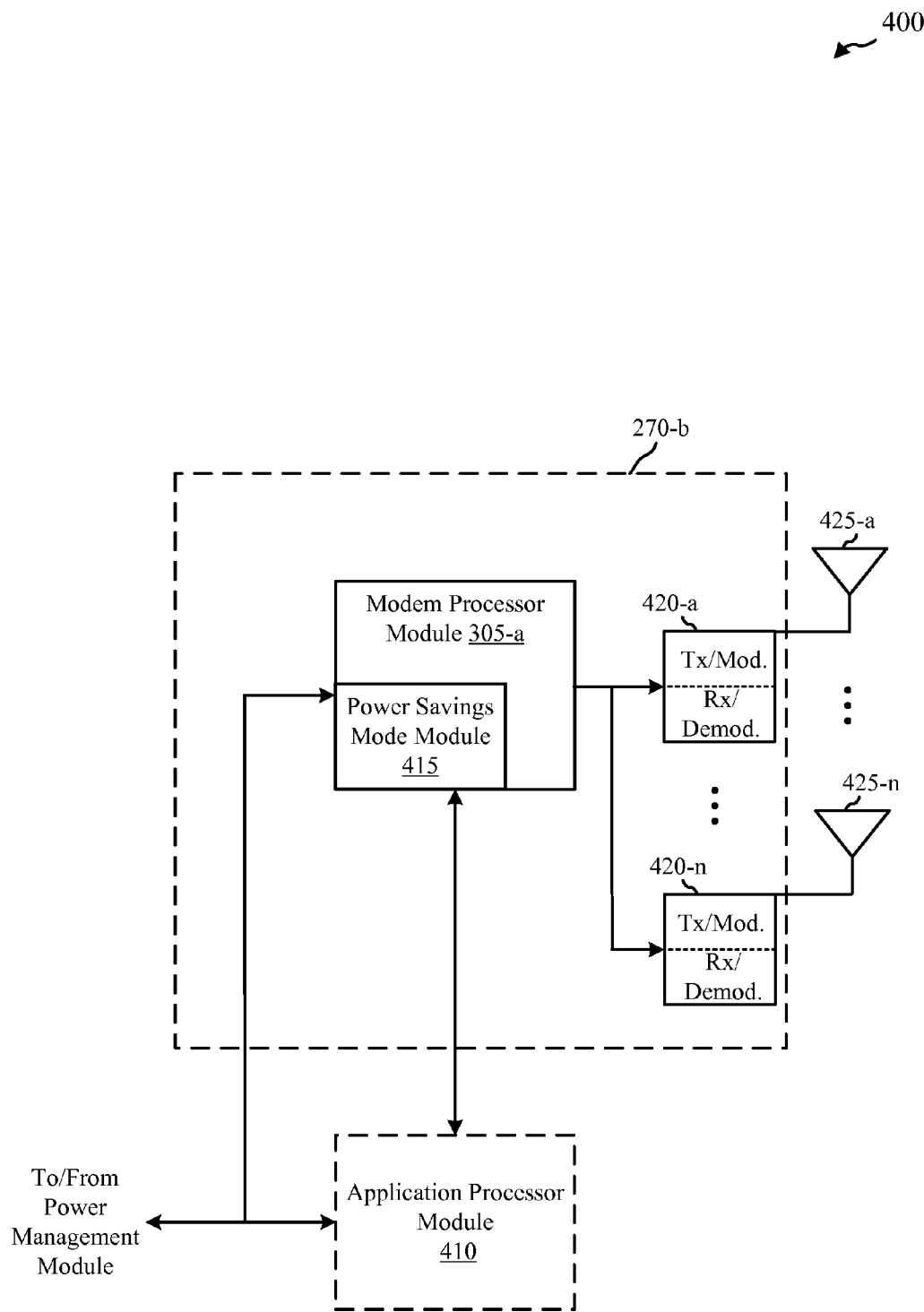
FIG. 4 shows a block diagram of another example of modem module in accordance with various aspects of the disclosure.

With reference now to FIG. 4, an example of a device 270-*b* is illustrated. Device 270-*b* may be an example of modem module(s) 270 of FIG. 2 and/or device 270-*a* of FIG. 3. In some examples, the device 270-*b* may be an example of one or more aspects of UE 115 or UE 115-*a* described with reference to FIG. 1 and/or FIG. 2. Device 270-*b* in this example includes a modem processor module 305-*a* that includes a power savings mode module 415. An optional application processor module 410 may be in communication with modem processor module 305-*a*. The modem processor module 305-*a* may be an example of modem processor module 305 of FIG. 3. The application processor module 410 may be communicatively coupled with a power management module, such as a power management module 240 of FIG. 2, and/or a PMIC, for example.

Device 270-*b* also includes transmit/receive modulators/demodulators 420-*a* through 420-*n*, which are each communicatively coupled with the modem processor module 305-*a*. Each of the transmit/receive modulators/demodulators 420-*a* through 420-*n* are communicatively coupled with antennas 425-*a* through 425-*n*. Modem processor module 305-*a* may use two or more transmit/receive modulators/demodulators 420 and associated antennas 425 to support multiple concurrent wireless transmissions on two or more component carriers, for example. The modem processor module 305-*a* may communicate that the UE is able to transmit and/or receive communications using multiple concurrent transmissions through advertising the UE's rank, which indicates the number of available transmit/receive chains at the UE.

In some examples, the power savings mode module 415 may determine a present charge state of a UE power source and, based on the present charge state, invoke one or more power saving techniques, such as described above with respect to FIGS. 1, 2 and/or 3, for example. The power savings mode module 415 may receive present charge state from, for example, application processor module 410. Application processor module 410 may communicate with a power management module, as noted above, and obtain present charge state of the UE power source based on information from the power management module. The application processor may use the present charge state to provide a charge indicator on a user interface of the UE, for example, and may also provide the present charge state to the power savings mode module 415. In other examples, the power savings mode module 415 may communicate with power management module 240 of FIG. 2, and/or PMIC, for example.

Based on the current state of charge of the power source, power savings mode module 415 may selectively activate or deactivate one or more receive chains, and thereby change the power requirements of the device 270-*a*, as discussed above. For example, if the power savings mode module 415 determines that the present state of charge of the power source is less than a threshold level, the advertised rank of the device may be reduced and thereby the number of active or available receive chains may be less than the actual number of receive chains. In some examples, the number of available receive chains may be reduced in one or more increments based on two or more threshold levels of power source charge. For example, if a maximum rank is four, the power savings mode module 415 may change the rank from four to two when the power source is at or below 20%, and may further change the rank from two to one when the power source is at or below 10%.

The power savings mode module 415 may also, or alternatively, reduce power consumption through one or more changes to frequency of FSCAN requests, for example. As discussed above, UE 115-*a* may periodically perform FSCAN operations to search for signals and/or base stations suitable for wireless communication. According to some examples, a time delay between one or more FSCAN requests may be increased based on the present state of charge of the power source. In some examples, the time delay is increased based on a number of consecutive unsuccessful FSCAN requests. For example, following consecutive unsuccessful FSCAN requests, a delay may be implemented before initiating another FSCAN request, and the delay may be further increased based on one or more of the power source charge state and/or additional consecutive unsuccessful FSCAN requests. Furthermore, the delay may be increased incrementally based on two or more threshold levels of the present state of charge of the power source.

Likewise, as mentioned above, the power savings mode module 415 may invoke a power savings mode that reduces a frequency of neighbor searches. In certain examples, the rate of neighborhood search requests performed may be reduced based on one or more of the current state of charge of power source and/or the RSRP of a serving cell. Furthermore, the rate of neighbor searches may be reduced in two or more increments based on two or more threshold levels of the present state of charge of the power source. For example, if the power source has a low charge state, and the RSRP of the serving base station is relatively strong, a delay between consecutive neighbor search requests may be increased to extend the life of power source 285.

The power savings mode module 415 may, in further examples, invoke a power savings mode to adjust a BSR parameter to indicate a reduced amount of data relative to an actual amount of data that is buffered to be transmitted from device 270-b. Such an action will result in reduced or no uplink resource grants provided to the UE, and thereby extend the life of the power source 285. In still further examples, power savings mode module 415 may adjust a maximum transmit power level for an uplink channel based on the current state of charge of the power source. As noted above, power savings mode module 415 may invoke one or more power savings modes based on a present state of charge of the power source of the device 270-b. For example, if a present state of charge of the power source is 30%, the power savings mode module 415 may invoke a power savings mode to increase one or more delays in FSCAN and/or neighbor search operations. Such an action may enhance the lifetime of the power source, and provide relatively little impact on user experience.

If the present state of charge drops below 20%, the power savings mode module 415 may invoke, in addition to previously invoked power savings modes, a power savings mode to reduce the advertised rank of the UE. Such an action may reduce a data rate available for transmitting data, and also reduce power consumption and thereby enhance the life of the power source. In some examples, if the present state of charge drops below 10%, the power savings mode module 415 may invoke, in addition to previously invoked power savings modes, a power savings mode to reduce an advertised value reported in a BSR. Finally, if the present state of charge drops below 5%, the power savings mode module 415 may invoke, in addition to previously invoked power savings modes, a power savings mode to reduce the maximum transmit power level for an uplink channel.

Of course, the percentages and order of invoking power savings modes discussed above are exemplary, and different values and order of invoking power savings modes may be changed as will be readily apparent to one of skill in the art. Furthermore, in some examples, the order and threshold levels for invoking power savings modes may be adaptively determined based on current use of the device and/or based on current channel conditions. For example, if no data or voice traffic is being transmitted using a UE, and the device has been idle for a relatively long period of time, the power savings mode module 415 may simply invoke the delays for neighbor search and FSCAN at a single threshold level, as reducing advertised rank, adjusting the BSR value, and transmit power will have limited impact on remaining power source life. Similarly, if it is determined that multiple consecutive FSCAN operations have been unsuccessful, a power savings mode to increase delay between consecutive FSCAN operations may be implemented at a relatively high level of charge of the power source to reduce the power drain on the power source.

Figure 5:
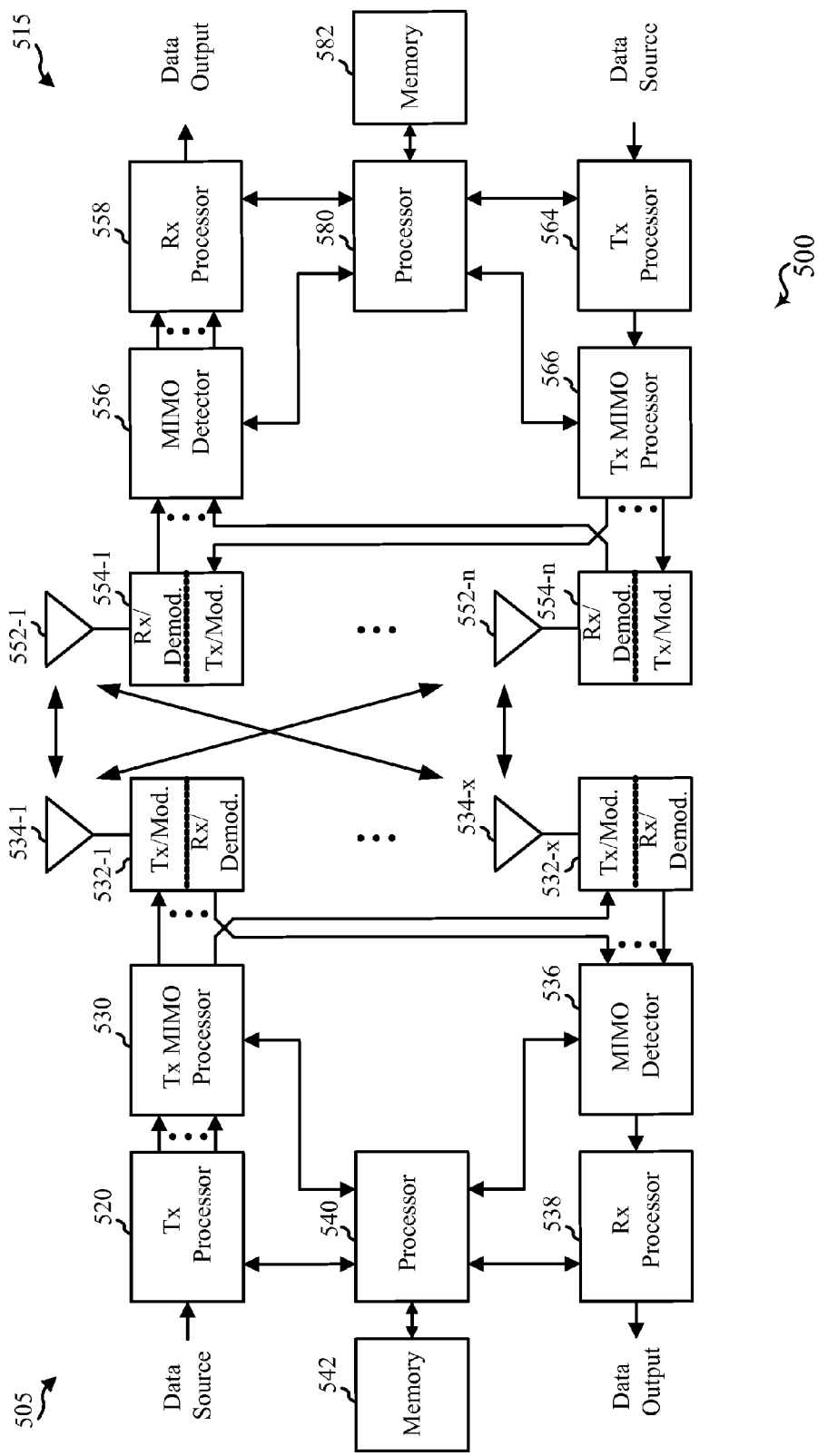
FIG. 5 shows a block diagram of an example of a wireless communications system including a base station and a mobile device in accordance with various aspects of the disclosure.

FIG. 5 is a block diagram of a system 500 including a base station 505 and a mobile device 515. This system 500 may be an example of the system 100 of FIG. 1. The base station 505 may be equipped with antennas 534-1 through 534-x, and the mobile device 515 may be equipped with antennas 552-1 through 552-n. At the base station 505, a transmit processor 520 may receive data from a data source.

The transmit processor 520 may process the data. The transmit processor 520 may also generate reference symbols, and a cell-specific reference signal. A transmit (TX) MIMO processor 530 may perform spatial processing (e.g., precoding) on data symbols, control symbols, and/or reference symbols, if applicable, and may provide output symbol streams to the transmit modulators 532-1 through 532-x. Each modulator 532 may process a respective output symbol stream (e.g., for OFDM, etc.) to obtain an output sample stream. Each modulator 532 may further process (e.g., convert to analog, amplify, filter, and upconvert) the output sample stream to obtain a downlink (DL) signal. In one example, DL signals from modulators 532-1 through 532-x may be transmitted via the antennas 534-1 through 534-x.

At the mobile device 515, the mobile device antennas 552-1 through 552-n may receive the DL signals according to the particular TDD Uplink/Downlink configuration from the base station 505 and may provide the received signals to the demodulators 554-1 through 554-n, respectively. Each demodulator 554 may condition (e.g., filter, amplify, downconvert, and digitize) a respective received signal to obtain input samples. Each demodulator 554 may further process the input samples (e.g., for OFDM, etc.) to obtain received symbols. A MIMO detector 556 may obtain received symbols from all the demodulators 554-1 through 554-n, perform MIMO detection on the received symbols if applicable, and provide detected symbols. A receive processor 558 may process (e.g., demodulate, deinterleave, and decode) the detected symbols, providing decoded data for the mobile device 515 to a data output, and provide decoded control information to a processor 580, or memory 582. The processor 580 may perform power save mode operations as discussed above with respect to FIGS. 1-4, for example. However, any other UE processor or module in FIG. 5 may be employed to perform the power save mode operations as discussed above with respect to FIGS. 1-4.

On the uplink (UL), at the mobile device 515, a transmit processor 564 may receive and process data from a data source. The transmit processor 564 may also generate reference symbols for a reference signal. The symbols from the transmit processor 564 may be precoded by a transmit MIMO processor 566 if applicable, further processed by the demodulators 554-1 through 554-n (e.g., for SC-FDMA, etc.), and be transmitted to the base station 505 in accordance with the transmission parameters received from the base station 505. At the base station 505, the UL signals from the mobile device 515 may be received by the antennas 534, processed by the demodulators 532, detected by a MIMO detector 536 if applicable, and further processed by a receive processor 538. The receive processor 538 may provide decoded data to a data output and to the processor 540. A memory 542 may be coupled with the processor 540. Similarly as discussed above, system 500 may support operation on multiple component carriers, each of which include waveform signals of different frequencies that are transmitted between base station 505 and devices 515. Multiple component carriers may carry uplink and downlink transmissions between mobile device 515 and base station 505, and base station 505 may support operation on multiple component carriers. The components of the mobile device 515 may, individually or collectively, be implemented with one or more Application Specific Integrated Circuits (ASICs) adapted to perform some or all of the applicable functions in hardware. Each of the noted modules may be a means for performing one or more functions related to operation of the system 500. Similarly, the components of the base station 505 may, individually or collectively, be implemented with one or more Application Specific Integrated Circuits (ASICs) adapted to perform some or all of the applicable functions in hardware. Each of the noted components may be a means for performing one or more functions related to operation of the system 500.

Figure 6:
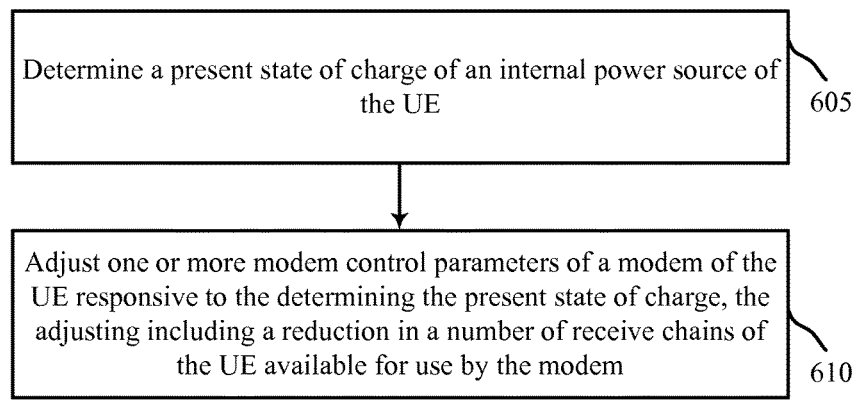
FIG. 6 is a flowchart of a method for managing power of a UE in accordance with various aspects of the disclosure.

FIG. 6 illustrates a method 600 that may be carried out by a UE in a wireless communications system according to various examples. The method 600 may, for example, be performed by a UE 115 of FIGS. 1, 2, and/or 5. Additionally, method 600 may be carried out by devices 270, 270-*a* and/or 270-*b* of FIGS. 2, 3, and/or 4, respectively. In one example, an eNB, UE, or device may execute one or more sets of codes to control the functional elements of the eNB, UE, or device to perform the functions described below.

Initially, at block 605 the present state of charge of an internal power source of the UE is determined. The internal power source of the UE may be a battery, for example. According to examples, a power management circuit such as the power management module 240 described with reference to FIG. 2 may be configured to probe the internal power source 285 of the UE 115-*a* to determine a state of charge of the internal power source 285. In some examples, the UE 115-*a* modem module(s) 270 described with reference to FIG. 2 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285. The present state of charge of an internal power source of the UE 115 may also be determined by modem processor module 305 described with reference to FIG. 3, modem processor module 305-*a* described with reference to FIG. 4, and/or processor 580 of FIG. 5.

At block 610, one or more modem control parameters of a modem of the UE are adjusted in response to the determined present state of charge of the internal power source of the UE. Adjusting the one or more modem control parameters of a mode of the UE may include reducing a number of receive chains of the UE available for use by the modem, for example. The one or more modem control parameters may be adjusted by any of processor module 210, communications management module 230, power management module 240, and/or modem modules 270 described with reference to FIG. 2. In some examples, modem processor module 305 described with reference to FIG. 3, modem processor module 305-*a* described with reference to FIG. 4, and/or processor 580 of FIG. 5, respectively may be configured to adjust the one or more modem control parameters in response to the determined present state of charge of the internal power source.

Figure 7:
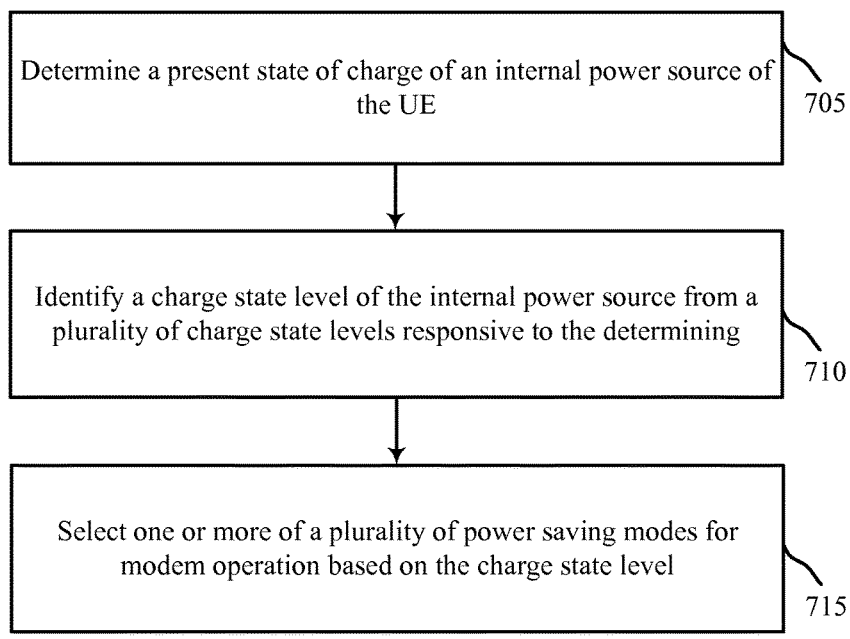
FIG. 7 is a flowchart of another method for managing power of a UE in accordance with various aspects of the disclosure.

FIG. 7 illustrates a method 700 that may be carried out by a UE in a wireless communications system according to various examples. The method 700 may, for example, be performed by a UE 115 of FIGS. 1, 2, and/or 5. Additionally, method 700 may be carried out by devices 270, 270-*a* and/or 270-*b* of FIGS. 2, 3, and/or 4, respectively. In one example, an eNB, UE, or device may execute one or more sets of codes to control the functional elements of the eNB, UE, or device to perform the functions described below.

Initially, at block 705 the present state of charge of an internal power source of the UE is determined. According to examples, a power management circuit such as the power management module 240 described with reference to FIG. 2 may be configured to probe the internal power source 285 of the UE 115-*a* to determine a state of charge of the internal power source 285. In some examples, the UE 115-*a* modem module(s) 270 described with reference to FIG. 2 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285. The present state of charge of an internal power source 285 of the UE 115-*a* may also be determined by modem processor module 305 described with reference to FIG. 3, modem processor module 305-*a* described with reference to FIG. 4, and/or processor 580 of FIG. 5.

At block 710, a charge state level of the internal power source is identified from a plurality of charge state levels in response to determining the present state of charge of the internal power source. The charge state levels may correspond to a remaining level of available power of the power source, and may include, for example, one or more warning states based on an amount of remaining charge. For example, a first level of remaining power of the power source 285 may correspond to a first charge state level, and a second level of remaining power, less than the first level of power, may correspond to a second charge state level. In other examples, there are three charge state levels. However, any number of charge state levels may be used. In some examples, the power management module 240 described with reference to FIG. 2 may identify the charge state level based on the present state of charge of the power source 285. In other examples, the modem module(s) 270 described with reference to FIG. 2 may identify the charge state level based on the present state of charge of the power source 285. The charge state level of an internal power source 285 of the UE 115-*a* may also be identified by modem processor module 305 described with reference to FIG. 3, modem processor module 305-*a* described with reference to FIG. 4, and/or processor 580 of FIG. 5.

At block 715, one or more of the plurality of power saving modes for modem operation is selected based on the charge state level. The one or more power saving modes may control various functions of UE 115-*a* and/or the various modules and processors contained within UE 115-*a*. In certain examples, the power saving modes are controlled by or associated with one or more algorithms. The one or more power savings modes may be controlled by any of the processor module 210, the one or more modem module(s) 270, the communications management module 230 and/or the power management module 240 described with reference to FIG. 2. In some examples, the one or more power savings modes may be controlled by any of the modem processor module 305 described with reference to FIG. 3, modem processor module 305-*a* described with reference to FIG. 4, and/or processor 580 of FIG. 5.

Figure 8:
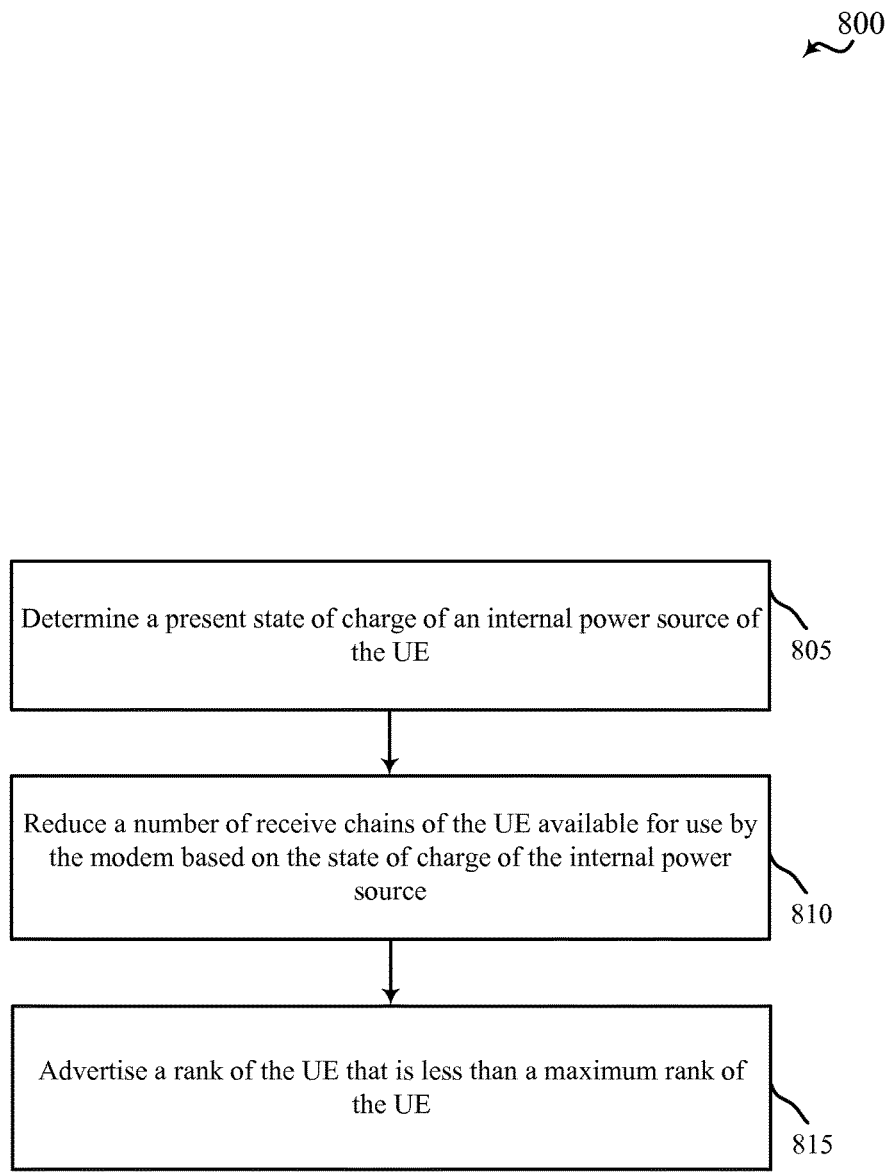
FIG. 8 is a flowchart of another method for managing power of a UE in accordance with various aspects of the disclosure.

FIG. 8 illustrates a method 800 that may be carried out by a UE in a wireless communications system according to various examples. The method 800 may, for example, be performed by a UE 115 of FIGS. 1, 2, and/or 5. Additionally, method 800 may be carried out by devices 270, 270-*a* and/or 270-b of FIGS. 2, 3, and/or 4, respectively. In one example, an eNB, UE, or device may execute one or more sets of codes to control the functional elements of the eNB, UE, or device to perform the functions described below.

Initially, at block 805, the present state of charge of an internal power source of the UE is determined. According to examples, a power management circuit such as the power management module 240 described with reference to FIG. 2 may be configured to probe the internal power source 285 of the UE 115-a to determine a state of charge of the internal power source 285. In some examples, the UE 115-a modem modules 270 described with reference to FIG. 2 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285. The present state of charge of an internal power source 285 of the UE may also be determined by modem processor module 305 described with reference to FIG. 3, modem processor module 305-a described with reference to FIG. 4, and/or processor 580 of FIG. 5.

At block 810, a number of receive chains of the UE available for use by the modem is reduced based on the state of charge of the internal power source. Multiple receive chains may allow a UE 115 to receive and process multiple signals simultaneously. However, the number of available receive chains may have an effect on the power consumption of a UE 115. As mentioned above, based on the current state of charge of power source 285, the UE 115-a may selectively activate or deactivate one or more receive chains, and thereby change the power requirements of the UE 115-a, by adjusting one or more modem control parameters of the UE 115-a. The activation or deactivation may be initiated by one or more of the modem module(s) 270, the processor module 210, the communications management module 230 and/or the power management module 240 described with reference to FIG. 2. In some examples, the activation or deactivation may be controlled by any of the modem processor module 305 described with reference to FIG. 3, modem processor module 305-a described with reference to FIG. 4, processor 580 of FIG. 5, the power savings mode module 415, and/or the application processor module 410 described with reference to FIG. 4.

At block 815, a rank of the UE that is less than a maximum rank of the UE is advertised. Although shown as a separate block, in aspects, block 815 may be included in or a sub-block of block 810. As discussed above, the number of available receive chains may be changed through, for example, advertising the rank of the UE 115 based on the charge state of power source 285. The advertised rank is at its maximum when all of the receive chains included in a UE 115 are active or available. Therefore, in some examples, the number of available receive chains may be reduced by advertising a rank of the UE 115 that is less than a maximum rank of the UE 115. A rank of the UE 115-a that is less than a maximum rank of the UE 115-a may be advertised by any of the processor module 210, the one or more modem module(s) 270, the communications management module 230 and/or the power management module 240 described with reference to FIG. 2. In some examples, the advertised rank may be controlled by any of the modem processor module 305 described with reference to FIG. 3, modem processor module 305-a described with reference to FIG. 4, processor 580 of FIG. 5, the power savings mode module 415, or the application processor module 410 described with reference to FIG. 4.

Figure 9:
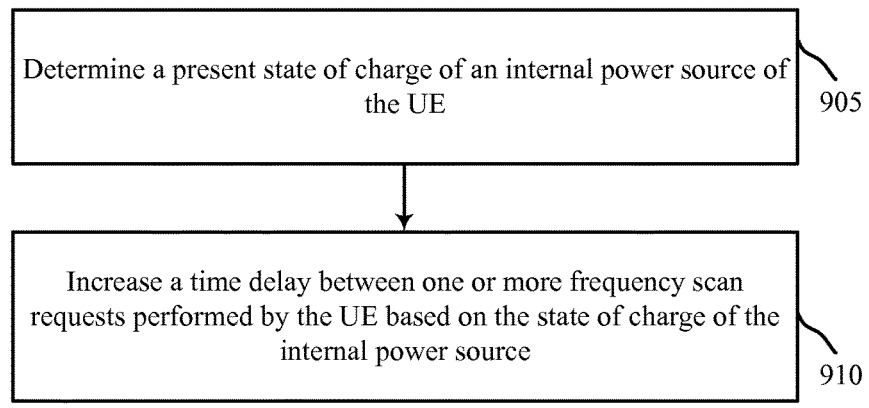
FIG. 9 is a flowchart of another method for managing power of a UE in accordance with various aspects of the disclosure.

FIG. 9 illustrates a method 900 that may be carried out by a UE in a wireless communications system according to various examples. The method 900 may, for example, be performed by a UE 115 of FIGS. 1, 2, and/or 5. Additionally, method 900 may be carried out by devices 270, 270-a and/or 270-b of FIGS. 2, 3, and/or 4, respectively. In one example, an eNB, UE, or device may execute one or more sets of codes to control the functional elements of the eNB, UE, or device to perform the functions described below.

Initially, at block 905, the present state of charge of an internal power source of the UE is determined. According to examples, a power management circuit such as the power management module 240 described with reference to FIG. 2 may be configured to probe the internal power source 285 of the UE 115-a to determine a state of charge of the internal power source 285. In some examples, the UE 115-a modem module(s) 270 described with reference to FIG. 2 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285. The present state of charge of an internal power source 285 of the UE 115-a may also be determined by modem processor module 305 described with reference to FIG. 3, modem processor module 305-a described with reference to FIG. 4, and/or processor 580 of FIG. 5.

At block 910, a time delay between one or more frequency scan requests performed by the UE is increased based on the state of charge of the internal power source. As discussed above, in some examples, the power consumption of a UE may be adjusted through one or more changes to the FSCAN requests of the UE. For example, when channel conditions are poor, frequent FSCAN requests may consume a significant amount of battery power. In some examples, to manage the power of a UE 115-a, a time delay between one or more FSCAN requests may be increased. The time delay may be increased by adjusting one or more modem control parameters of a modem of the UE 115-a based on the present state of charge of the power source 285. One or more of the processor module 210, the modem module(s) 270, the communications management module 230 and/or the power management module 240 described with reference to FIG. 2 may control the time delay between FSCAN requests. In some examples, the time delay between FSCAN requests may be controlled by any of the modem processor module 305 described with reference to FIG. 3, modem processor module 305-a described with reference to FIG. 4, the processor 580 of FIG. 5, the power savings mode module 415, and/or the application processor module 410 described with reference to FIG. 4.

Figure 10:
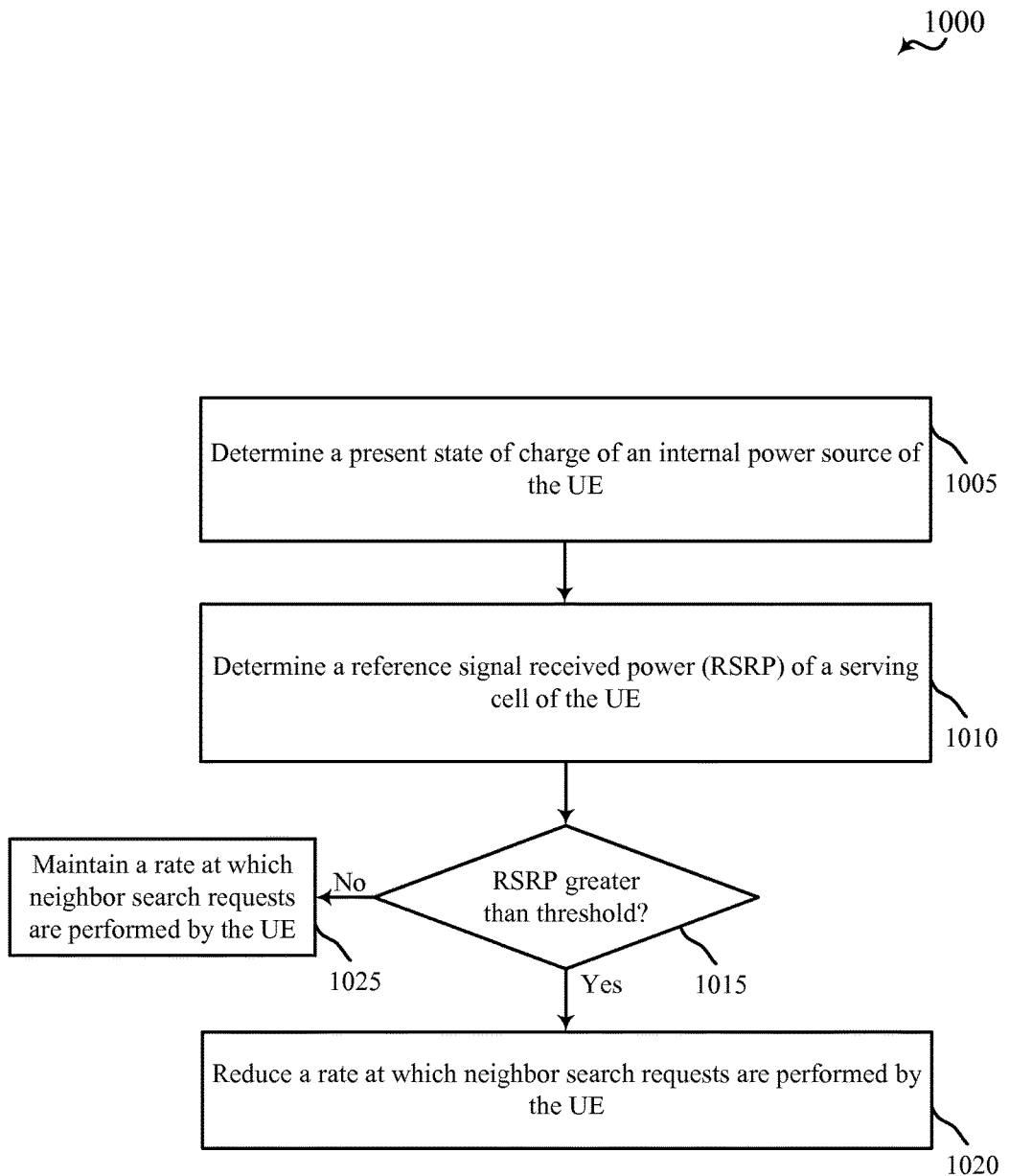
FIG. 10 is a flowchart of another method for managing power of a UE in accordance with various aspects of the disclosure.

FIG. 10 illustrates a method 1000 that may be carried out by a UE in a wireless communications system according to various examples. The method 1000 may, for example, be performed by a UE 115 of FIGS. 1, 2, and/or 5. Additionally, method 1000 may be carried out by devices 270, 270-a and/or 270-b of FIGS. 2, 3, and/or 4, respectively. In one example, an eNB, UE, or device may execute one or more sets of codes to control the functional elements of the eNB, UE, or device to perform the functions described below.

Initially, at block 1005, the present state of charge of an internal power source of the UE is determined. According to examples, a power management circuit such as the power management module 240 described with reference to FIG. 2 may be configured to probe the internal power source 285 of the UE 115-*a* to determine a state of charge of the internal power source 285. In some examples, the UE 115-*a* modem module(s) 270 described with reference to FIG. 2 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285. The present state of charge of an internal power source 285 of the UE 115-*a* may also be determined by modem processor module 305 described with reference to FIG. 3, modem processor module 305-*a* described with reference to FIG. 4, and/or processor 580 of FIG. 5.

At block 1010, a reference signal received power (RSRP) of a serving cell of the UE is determined. As mentioned above, UE 115-*a* may periodically perform a neighbor search to identify channel conditions of one or more neighboring base stations. As part of the neighbor search requests, a UE 115-*a* may also make one or more measurements. For example, the UE 115-*a* may determine a reference signal received power (RSRP) of the serving base station and one or more neighboring base stations. In aspects, the RSRP of a serving cell may be determined by any of the processor module 210, the modem module(s) 270, the communications management module 230 and/or the power management module 240 described with reference to FIG. 2. In some examples, the RSRP may be determined by any of the modem processor module 305 described with reference to FIG. 3, modem processor module 305-*a* described with reference to FIG. 4, the processor 580 of FIG. 5, the power savings mode module 415, and/or the application processor module 410 described with reference to FIG. 4.

At block 1015, the RSRP is compared to a predetermined threshold. If the RSRP is not greater than the predetermined threshold, then the rate at which neighborhood search requests are performed by the UE 115-*a* is maintained at block 1025. In aspects, the RSRP may be compared to a predetermined threshold by any of the processor module 210, the modem module(s) 270, the communications management module 230 and/or the power management module 240 described with reference to FIG. 2. In some examples, the RSRP may be compared to a predetermined threshold by any of the modem processor module 305 described with reference to FIG. 3, modem processor module 305-*a* described with reference to FIG. 4, the processor 580 of FIG. 5, the power savings mode module 415, and/or the application processor module 410 described with reference to FIG. 4.

However, if at block 1015, the RSRP is greater than the predetermined threshold, then at block 1020 the rate at which the neighborhood search requests are performed by the UE 115-*a* is reduced. In aspects, the rate at which these neighbor search requests are performed may be controlled by any of the processor module 210, the modem module(s) 270, the communications management module 230 and/or the power management module 240 described with reference to FIG. 2. In some examples, the rate at which the neighbor search requests are performed may be controlled by any of the modem processor module 305 described with reference to FIG. 3, modem processor module 305-*a* described with reference to FIG. 4, the processor 580 of FIG. 5, the power savings mode module 415, and/or the application processor module 410 described with reference to FIG. 4.

Figure 11:
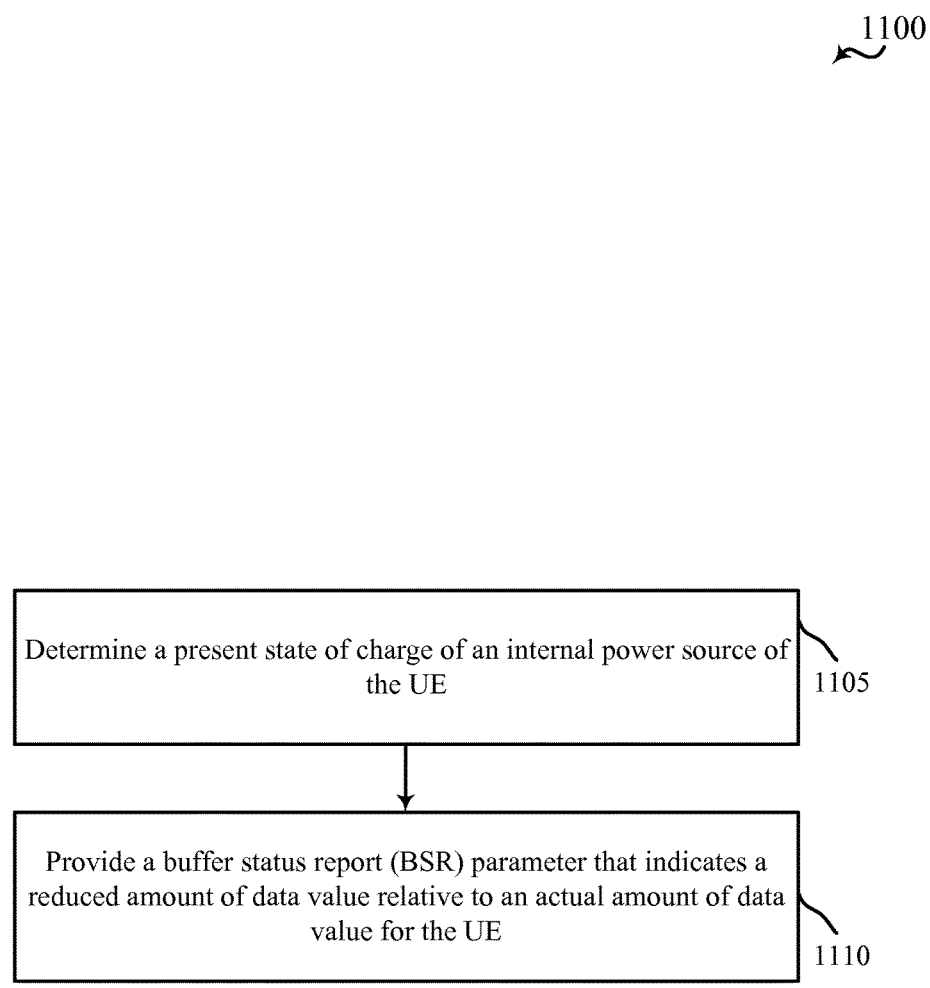
FIG. 11 is a flowchart of another method for managing power of a UE in accordance with various aspects of the disclosure.

FIG. 11 illustrates a method 1100 that may be carried out by a UE in a wireless communications system according to various examples. The method 1100 may, for example, be performed by a UE 115 of FIGS. 1, 2, and/or 5. Additionally, method 1100 may be carried out by devices 270, 270-*a* and/or 270-*b* of FIGS. 2, 3, and/or 4, respectively. In one example, an eNB, UE, or device may execute one or more sets of codes to control the functional elements of the eNB, UE, or device to perform the functions described below.

Initially, at block 1105, the present state of charge of an internal power source of the UE is determined. According to examples, a power management circuit such as the power management module 240 described with reference to FIG. 2 may be configured to probe the internal power source 285 of the UE 115-*a* to determine a state of charge of the internal power source 285. In some examples, the UE 115-*a* modem module(s) 270 described with reference to FIG. 2 may be configured to probe the state of charge of the power source 285 either directly or indirectly. In some examples, the power management module 240 probes the state of charge of the power source 285 and the modem module(s) 270 may periodically poll the power management module 240 to determine the present state of charge of the internal power source 285. The present state of charge of an internal power source 285 of the UE 115-*a* may also be determined by modem processor module 305 described with reference to FIG. 3, modem processor module 305-*a* described with reference to FIG. 4, and/or processor 580 of FIG. 5.

At block 1110, a BSR parameter is provided that indicates a reduced amount of data value relative to an actual amount of data value for the UE. Such an action will result in reduced or no uplink resource grants provided to the UE, and thereby extend the life of the power source 285. In aspects, the BSR parameter may be controlled by any of the processor module 210, the modem module(s) 270, the communications management module 230 and/or the power management module 240 described with reference to FIG. 2. In some examples, the BSR parameter may be controlled by the modem processor module 305 described with reference to FIG. 3, modem processor module 305-*a* described with reference to FIG. 4, the processor 580 of FIG. 5, the power savings mode module 415, and/or the application processor module 410 described with reference to FIG. 4.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for managing power of a user equipment (UE) in a wireless communications network, comprising:
    determining a present state of charge of an internal power source of the UE;
    adjusting, responsive to determining that the present state of charge is at or below a threshold, one or more modem control parameters of a modem of the UE, the adjusting including a reduction in a number of receive chains of the UE available for use by the modem; and
    advertising a rank of the UE that is less than a maximum rank of the UE based at least in part on the reduction in the number of receive chains.

2. The method of claim 1, wherein:
    the determining comprises identifying a charge state level of the internal power source from a plurality of charge state levels responsive to the determining; and
    the adjusting comprises selecting a power saving mode for the modem based on the identified charge state level.

3. The method of claim 1, wherein the adjusting one or more modem control parameters further comprises:
    reducing a rate of neighbor search requests performed by the UE.

4. The method of claim 3, further comprising:
    determining a reference signal received power (RSRP), wherein the rate of neighbor search requests is based on the RSRP.

5. The method of claim 3, wherein the neighbor search requests comprise one or more of inter-frequency or inter-radio access technology measurements.

6. The method of claim 1, wherein the adjusting one or more modem control parameters further comprises:
    providing a buffer status report (BSR) parameter that indicates a reduced amount of data value relative to an actual amount of data value for the UE.

7. The method of claim 1, wherein the adjusting one or more modem control parameters further comprises:
    adjusting a maximum transmit power level for an uplink channel.

8. The method of claim 1, wherein the adjusting one or more modem control parameters further comprises:
    increasing a time delay between one or more frequency scan requests performed by the UE.

9. The method of claim 8, wherein the time delay is increased based on a number of consecutive unsuccessful frequency scan requests.

10. An apparatus for managing power of a user equipment (UE) in a wireless communications network, comprising:
    at least one processor configured to:
        determine a present state of charge of an internal power source of the UE;
        adjust, responsive to determining that the present state of charge is at or below a threshold, one or more modem control parameters of a modem of the UE to reduce a number of receive chains of the UE available for use by the modem; and
        advertise a rank of the UE that is less than a maximum rank of the UE based at least in part on the reduction in the number of receive chains.

11. The apparatus of claim 10, wherein the at least one processor is further configured to:
identify a charge state level of the internal power source from a plurality of charge state levels responsive to the determining; and
select a power saving mode for the modem based on the identified charge state level.

12. The apparatus of claim 10, wherein the at least one processor is further configured to:
reduce a rate of neighbor search requests performed by the UE.

13. The apparatus of claim 12, wherein the at least one processor is further configured to:
determine a reference signal received power (RSRP), wherein the rate of neighbor search requests is based on the RSRP.

14. The apparatus of claim 12, wherein the neighbor search requests comprise one or more of inter-frequency or inter-radio access technology measurements.

15. The apparatus of claim 10, wherein the at least one processor is further configured to:
provide a buffer status report (BSR) parameter that indicates a reduced amount of data value relative to an actual amount of data value for the UE.

16. The apparatus of claim 10, wherein the at least one processor is further configured to:
adjust a maximum transmit power level for an uplink channel.

17. The apparatus of claim 10, wherein the at least one processor is further configured to:
increase a time delay between one or more frequency scan requests performed by the UE.

18. The apparatus of claim 17, wherein the time delay is increased based on a number of consecutive unsuccessful frequency scan requests.

19. An apparatus for managing power of a user equipment (UE) in a wireless communications network, comprising:
means for determining a present state of charge of an internal power source of the UE;
means for adjusting, responsive to determining that the present state of charge is at or below a threshold, one or more modem control parameters of a modem of the UE to reduce a number of receive chains of the UE available for use by the modem; and
means for advertising a rank of the UE that is less than a maximum rank of the UE based at least in part on the reduction in the number of receive chains.

20. The apparatus of claim 19, wherein:
the means for determining comprises means for identifying a charge state level of the internal power source from a plurality of charge state levels responsive to the determining; and
the means for adjusting comprises means for selecting a power saving mode for the modem based on the identified charge state level.

21. The apparatus of claim 19, wherein the means for adjusting one or more modem control parameters comprises means for reducing a rate of neighbor search requests performed by the UE.

22. The apparatus of claim 19, wherein at least one of:
the means for adjusting one or more modem control parameters includes means for providing a buffer status report (BSR) parameter that indicates a reduced amount of data value relative to an actual amount of data value for the UE; or
the means for adjusting one or more modem control parameters includes means for increasing a time delay between one or more frequency scan requests performed by the UE.

23. A computer program product for managing power of a user equipment (UE) in a wireless communications network, the computer program product comprising a non-transitory computer-readable medium storing one or more instructions executable by a processor to:
determine a present state of charge of an internal power source of the UE;
adjust, responsive to determining that the present state of charge is at or below a threshold, one or more modem control parameters of a modem of the UE to reduce a number of receive chains of the UE available for use by the modem; and
advertise a rank of the UE that is less than a maximum rank of the UE based at least in part on the reduction in the number of receive chains.

24. The computer program product of claim 23, wherein the one or more instructions are further executable by the processor to identify a charge state level of the internal power source from a plurality of charge state levels responsive to the determining, and select a power saving mode for the modem based on the identified charge state level.

25. The computer program product of claim 23, wherein the one or more instructions are further executable by the processor to reduce a rate of neighbor search requests performed by the UE.

26. The computer program product of claim 23, wherein at least one of:
the one or more instructions are further executable by the processor to provide a buffer status report (BSR) parameter that indicates a reduced amount of data value relative to an actual amount of data value for the UE; or
the one or more instructions are further executable by the processor to increase a time delay between one or more frequency scan requests performed by the UE.

* * * * *